US012688983B2

(12) United States Patent

Becker-Hennecke

(10) Patent No.: US 12,688,983 B2

(45) Date of Patent: Jul. 21, 2026

(54) ARRANGEMENT OF A SWITCHING DEVICE WITH A FUNCTIONAL MODULE, FUNCTIONAL MODULE AND METHOD FOR OPERATING THE SAME

(71) Applicant: INSTA GMBH, Lüdenscheid (DE)

(72) Inventor: Ralph Becker-Hennecke, Schwerte (DE)

(73) Assignee: INSTA GMBH, Lüdenscheid (DE)

( * ) Notice: Subject to any disclaimer, the term of this patent is extended or adjusted under 35 U.S.C. 154(b) by 329 days.

(21) Appl. No.: 18/706,509

(22) PCT Filed: Oct. 13, 2022

(86) PCT No.: PCT/EP2022/078568

§ 371 (c)(1),
(2) Date: May 1, 2024

(87) PCT Pub. No.: WO2023/104379

PCT Pub. Date: Jun. 15, 2023

(65) Prior Publication Data

US 2025/0014843 A1 Jan. 9, 2025

(30) Foreign Application Priority Data

Dec. 9, 2021 (DE) ..................... 10 2021 132 395.9

(51) Int. Cl.
*H01H 9/54* (2006.01)
*H01H 9/02* (2006.01)

(52) U.S. Cl.
CPC ................ *H01H 9/54* (2013.01); *H01H 9/02* (2013.01)

(58) Field of Classification Search
CPC .. H01H 9/54; H01H 9/02; H03K 2217/94068; H03K 17/972; H03K 17/97
See application file for complete search history.

(56) References Cited

U.S. PATENT DOCUMENTS

2015/0179377 A1* 6/2015 Han ..................... H01H 9/0271 307/125
2017/0062168 A1 3/2017 Amirthasamy

FOREIGN PATENT DOCUMENTS

AT 512033 B1 5/2013
DE 102005063070 A1 7/2007
(Continued)

OTHER PUBLICATIONS

Office Action dated May 10, 2022 in related Austrian application A50046/2022.
(Continued)

*Primary Examiner* — Mohamad A Musleh
(74) *Attorney, Agent, or Firm* — Polson Intellectual Property Law P.C.; Margaret Polson; Christopher Sylvain

(57) ABSTRACT

An arrangement of a functional module for installing in an installation box with a manually operable switching device used in building installation technology. The functional module can be influenced by actuation of an actuating element connected to the switching device and associated with an upper part of the switching device. The functional module has at least one interface, via which at least one actuator can be activated in accordance with an actuation of the actuating element. At least one magnet, which changes its position when the actuating element is actuated, is arranged on the switching device. The functional module has a sensor for sensing the magnetic field, so that the change in the magnetic field when the actuating element is actuated is detected. The functional module has an evaluation unit for evaluating the change in the magnetic field and designed to identify from the sensed change in the magnetic field what kind of switching device is concerned, and this identification is used in the activation of the actuator by the functional module.

15 Claims, 4 Drawing Sheets

(56) References Cited

FOREIGN PATENT DOCUMENTS

| | | | | |
|---|---|---|---|---|
| DE | 102011054357 | A1 | 4/2013 | |
| DE | 202015002526 | U1 | 6/2015 | |
| DE | 202019105275 | U1 | 1/2020 | |
| EP | 1014001 | A2 | 6/2000 | |
| EP | 1524750 | A2 * | 4/2005 | .............. H02J 13/34 |

OTHER PUBLICATIONS

Office Action dated Aug. 4, 2022 in related German application 102021132395.9.

International Search Report mailed Jan. 20, 2023 in parent international application PCT/EP2022/078568.

International Preliminary Report on Patentability, PCT Chapter I (WO-Isa) issued Jun. 5, 2024 in parent international application PCT/EP2022/078568.

Albrecht Jung GMBH & Co. KG, "1-gang switch (insert) 10 AX 250 V~, 1-pole, 2-way" webpage, accessed Dec. 2, 2024, <www.jung-group.com/en-DE/p/1-gang-switch-insert-1-pole-2-way-10-AX-250-V/506-U>.

INSTA GMBH, "Nexentro products" webpage, accessed Dec. 2, 2024, <www.nexentro.de/produkte>.

* cited by examiner

ARRANGEMENT OF A SWITCHING DEVICE WITH A FUNCTIONAL MODULE, FUNCTIONAL MODULE AND METHOD FOR OPERATING THE SAME

BACKGROUND

The disclosure relates to an arrangement of a functional module for installing in an installation box with a manually operable switching device used in building installation technology. The functional module can be influenced by actuation of an actuating element connected to the switching device and associated with an upper part of the switching device. The functional module has at least one interface, by means of which at least one actuator can be activated in accordance with an actuation of the actuation element. At least one magnet, which changes its position when the actuating element is actuated, is arranged on the switching device. The functional module has a sensor for sensing the magnetic field, so that the change in the magnetic field is detected when the actuating element is actuated. The disclosure further relates to a functional module and method for operating same.

Functional modules for electrical/electronic switching devices used in building installation technology (such as in www.jung-group.com/de-DE/Wippschalter-Universal-Aus-Wechsel-10-AX-250-V/506-U), wherein an upper part can be placed on the electrical/electronic switching device located in an installation cavity, are generally designed to control actuators and/or sensors via their independent channels, both via a switch or button and via an external device, for example a mobile device, via radio signal. Such functional modules are often used as button interfaces, dimming actuators, switching actuators or roller blind actuators and have, for example, two to four independent channels. In this respect, the functional modules are intended to extend the function of electrical/electronic switching devices, for example a button or switch. In this respect, a functional module is a component that must be distinguished from the electrical/electronic switching device. The functional module forms a symbiosis with the electrical/electronic switching device by assigning additional functions to the electrical/electronic switching device and optionally also enabling remote operation of the electrical/electronic switching device, for example dimming lights by operating the electrical/electronic switching device or by operating an application on a mobile device.

A functional module of the type mentioned at the outset is known from the prior art, for example according to the website nexentro.de. Such a functional module is designed for use in building installation technology and has a housing consisting of a base part and a cover part, in the interior of which the electrical/electronic components required for operation are accommodated on at least one electrical circuit board. The electrical circuit board is connected to multiple connecting cables to form an interface via which an electrical/electronic switching device is connected. Telegrams can be sent via several independent channels, wherein the telegrams are used to control various actuators, such as lights, roller blinds or sockets, or sensors, such as touch sensors. By installing the functional modules in installation sockets, the conventional, electromechanical switches are converted to “smart” switches.

In order to be able to evaluate the button signal of an electromechanical switch on a previously known functional module, at least three lines must be connected (outer conductor or phase L and switched output/control line and a control line for connecting the switch). For dual and roller blind applications, an additional control line is added; for switching or dimming applications, one or two control lines are added.

Since the limited space required makes it challenging to accommodate a functional module and the cables in the flush-mounted box, the omission of each cable represents a considerable optimization, especially because the space required in the installation cavity and the installation effort can be significantly reduced. In addition, the reduced number of electrical cables to be used makes the installation easier to understand and can therefore be carried out more safely and comprehensibly by the person installing it. This means there are fewer sources of error. For these reasons, there are obstacles for the broad mass of users who are not professional installers to use a functional module as described above.

In addition, the optimal control of, for example, blinds, sockets and dimmable lamps using such a functional module requires a button, i.e. a switch that is not permanently closed. This may require an elaborate upgrade of the existing building system infrastructure from switches to buttons—this also discourages many potential users from implementing such functional modules to convert dimmers, blinds and the like to the “smart type”.

AT 512 033 B1, US 2017/0062168 A1, DE 10 2005 063 070 A1 and EP 1 014 001 A2 disclose the possibility of transmitting actuation signals via magnetic fields for switching devices. The switching devices disclosed herein are already fully assembled at the factory and, if at all possible, are only replaced as a whole. This has the disadvantage of increased costs during conversion.

SUMMARY

Proceeding from this background, one aspect of the disclosure relates to creating a functional module for installation in an installation cavity for an electrical/electronic switching device in building installation technology, with which the wiring effort and thus the installation costs during installation are reduced, the space available in the installation box is increased, and at the same time the operation of an actuator is possible without control by a button—but as a switch—so that a particularly simple and cost-effective retrofitting of the functional modules is achieved. Another aspect is to provide a corresponding arrangement for a switching device and a method for operating the same.

The core idea is that the functional module according to the disclosure makes the previously required cable-based connection to the electrical/electronic switching device, in particular a switching device designed as a switch or button, unnecessary:

This is advantageously achieved by magnetically detecting the position of the actuating element of the switching device, which is fixedly mounted on the switching device, by the functional module and evaluating it accordingly.

The functional module for a switching device used in building installation technology, which is suitable for installation in an installation cavity, such as an installation box, can be influenced by means of the actuating element of the upper part of the switching device by arranging at least one magnet on the switching device. This magnet changes its position when the actuating element is operated. This change in position is detected by a sensor that detects the magnetic field when the actuating element is operated. Against this background, it is clear that the switching device itself does not necessarily have to have an electrical/electronic switching mechanism; it is sufficient to provide an actuating element that can be moved into different positions by a user.

Preferably it is provided that the magnet is arranged on the actuating element. The advantage of placing the magnet on the actuating element (instead of, for example, on the upper part receptacle on the side of the switching device base part) is that a greater distance is covered during actuation, so that the measured variable to be recorded by the evaluation unit, here: the magnetic field, is larger.

At the same time, it is provided that the functional module has an evaluation unit which is designed to detect the type of switching device that controls the functional module via the magnetic field. There are different types of switching devices that differ in terms of their user-side actuation movement. For example, unlike a button, a switch does not automatically return to its original position. A rotary knob, which allows continuous adjustment by turning, is another type of switching device. This information about the type of switching device influences the way in which the actuator is controlled based on a specific detected change in the magnetic field.

The functional module can in particular be intended as a retrofit kit. The switching device is then usually an electrical/electronic switching device. The existing electrical/electronic actuators in the switching device are no longer required; the functionality is replaced by the functional module. However, a complete replacement of the electrical/electronic switching device is not necessary.

The disclosure cleverly makes use of the existing interfaces, namely, on the one hand, the interface between the switching device base part permanently installed in an installation space and an upper part, which enables an uncomplicated replacement of the actuating element such as by an actuating element provided with at least one magnet, and on the other hand, the electrical interface between the actuator and the switching device. This makes conversion particularly easy. It can also be provided that the magnet is connected to the actuating element during retrofitting.

As a retrofit kit, the functional module usually has a housing in the interior of which the electrical/electronic components necessary for its function are housed on at least one electrical circuit board. The at least one electrical circuit board has at least one interface for connecting several electrical lines. Usually, all components required for operation are arranged compactly in a typically closed housing, with the interfaces required for operation on the outside, in particular for controlling the actuator and, if necessary, for its own power supply. The power supply can also be provided by a battery or by the energy provided or switched to the actuator or a combination thereof. The resulting self-sufficiency ensures easy installation. To do this, the switching device is usually removed, the functional module is inserted into the exposed installation cavity, the cables are disconnected from the switching module and connected to the functional module instead, the switching module is then reinserted into the installation cavity and finally the upper part is plugged onto the switching device.

In order for the functional module to identify the type of installed switching device, a user preferably performs a predetermined actuation of the switching device during a setup routine. The time-resolved detection of the magnetic field can be used to identify patterns that indicate a specific type of switching device. When actuated once, a switch remains in its position, while a button automatically returns to its original position. A rotary knob behaves differently. The corresponding patterns of the change in the magnetic field are compared with patterns stored in the functional module or made available via an external data connection, so that the type of switching device can be determined fully automatically in this way. This also makes it possible to calibrate the magnetic field sensor, especially in relation to an upper part that is used with multiple channels (e.g. a double switch or button).

The magnetic field sensor of the functional module preferably detects the magnetic field three-dimensionally, since this makes it possible to achieve particularly simple and reliable unambiguous determination of the position of the actuating element(s), particularly also in the case of multi-channel operation. This also allows the different movements of different types of switching device to be detected.

Due to the three-dimensional sensing, the use of only one magnetic field sensor can also be provided to operate the functional module. In this way, a multi-channel switching device comprising a plurality of actuating elements can be operated with only a single functional module.

Preferably, one functional module is provided for each type of actuator (such as lights, sockets or roller blinds). Thus, for a specific functional module, the actuator to be switched is known, so that the functional module can be adapted thereto in terms of control. This reduces the storage space required within the functional module.

Furthermore, it can be provided that a certain actuator-specific function is implemented in the functional module for a certain actuator type, which function is designed on the basis of a standard actuation. When the function is triggered, the functional module converts the actual type of actuation on the switching device side into the standard actuation on the function side via software, if the former deviates from the standard actuation. For example, suppose the function is designed for a button, so the default actuation is that of a button. If the functional module detects that the switching device is actually a switch (the actual actuation is that of a switch), it converts the switching actuation internally into a button signal and sends it to the actuator-specific function to control the actuator. In this way, the corresponding function needs to be stored in the usually compact functional module only for a single type of actuation, while control using different types of switching devices is still possible. This saves storage space. Updating the function is also made easier because less data needs to be transferred.

Preferably, the functional module has a dimming actuator for dimming dimmable loads, such as lamps. In this way, not only the functionality of dimming dimmable loads can be realized, but it also makes it possible to use dimming without a button (or by means of a rotary knob). This significantly reduces the infrastructural effort, so that the user is more likely to be encouraged to install a functional module according to the disclosure.

According to a preferred development of this functional module having a dimming actuator, the interface has a maximum of one connection for the neutral conductor, one connection for the phase, and one connection for the load to be dimmed. There is no need to wire the functional module to the electromechanical switching device. This means that only three cables are required instead of five (or even six cables for a two-way dimmer with one button) or, in two-wire operation, two cables are required instead of four (or even five cables for a two-way dimmer with one button). This not only reduces the installation effort, but also saves a considerable amount of space in the installation box.

In an alternative development of the functional module, the functional module has a switching actuator, in particular for switching plug sockets. The socket is usually a standard household plug socket for supplying electrical/electronic devices with a voltage of approximately 110-230 V, but can also include proprietary systems with a low voltage. Since the position of the switching device is sensed magnetically via the magnetic sensor, there is no need for complex wiring of the functional module with the electromechanical switching device.

According to a preferred development of this functional module having a switching actuator, the interface has a maximum of one connection for the neutral conductor, one connection for the phase, and one connection for the load to be connected. This means that only three cables are required instead of five. This not only reduces the installation effort, but also saves a considerable amount of space in the installation box.

In an alternative development of the functional module, the functional module has a roller blind actuator for controlling roller blinds. Since the position of the switching device is sensed magnetically via the magnetic sensor, there is no need for wiring of the functional module with the electromechanical switching device.

According to a preferred development of this functional module having a roller blind actuator, the interface has a maximum of one connection for the neutral conductor, one connection for the phase, and two connections for the load to be controlled. This means that only four cables are required instead of seven. This not only reduces the installation effort, but also saves a considerable amount of space in the installation box.

In an alternative development of the functional module, the functional module has a tactile sensor for actuating an electrical device. Since the position of the switching device is sensed magnetically via the magnetic sensor, there is no need for wiring of the functional module with the electromechanical switching device.

According to a preferred development of this functional module having a tactile sensor, the interface has a maximum of one connection for the neutral conductor and one connection for the phase. Therefore, only two cables are required instead of five (note: either a connection via the neutral conductor or via a control line is required). This not only reduces the installation effort, but also saves a considerable amount of space in the installation box.

Preferably, the functional module has an energy storage device, in particular a battery or a rechargeable battery, for energy supply. This advantageously reduces the wiring effort even further, since a connection to the neutral conductor and a connection to the phase can also be omitted.

Preferably, the magnetic field sensor is a MEMS magnetic sensor, also known as a microsystem technology (MST) sensor. Due to the small size of the MEMS magnetic sensor, it can be placed particularly close to the measuring location, thus achieving a higher spatial resolution compared to other magnetic field sensors. In addition, the MEMS magnetic sensor is particularly cost-effective and allows particularly precise multi-dimensional vectorial evaluation.

In some embodiments, the magnet is arranged on the side of the upper part or the actuating element facing away from the side visible to a user, i.e., on the inside of the upper part. This means that the magnet, which may protrude from the actuating element, is located such as not to be visible to the user.

In some embodiments, the magnet is adhesively bonded to the upper part or fixed to it by mechanical means. This type of fastening is particularly simple and cost-effective to implement.

The functional module is usually arranged to the rear of the switching device within the installation cavity provided for the switching device, such as a cavity wall box. To ensure a unique alignment during installation, the functional module is adapted to a standard installation cavity in its external dimensions, usually circular over at least one segment, such as more than 180°.

Furthermore, the disclosure relates to a method for operating a functional module for a switching device used in building installation technology, comprising the steps:

sensing by the magnetic field sensor of the magnetic field, which is produced by the magnet arranged at the electrical/electronic switching device, at the magnetic field sensor of the functional module, sensing of the change in the magnetic field as a consequence of a predetermined actuation of the actuating element, evaluating the detected change in the magnetic field by an evaluation unit to determine which type of switching device is concerned, in particular whether it is a switch or a button, and actuating an actuator by the functional module in accordance with a predetermined function mode, depending on the type of switching device.

BRIEF DESCRIPTION OF THE DRAWINGS

The following description is provided using several example embodiments with reference to the figures, wherein.

In the various figures, identical parts are provided with the same reference numerals and therefore usually named or mentioned only once.

DETAILED DESCRIPTION

Figure 1:
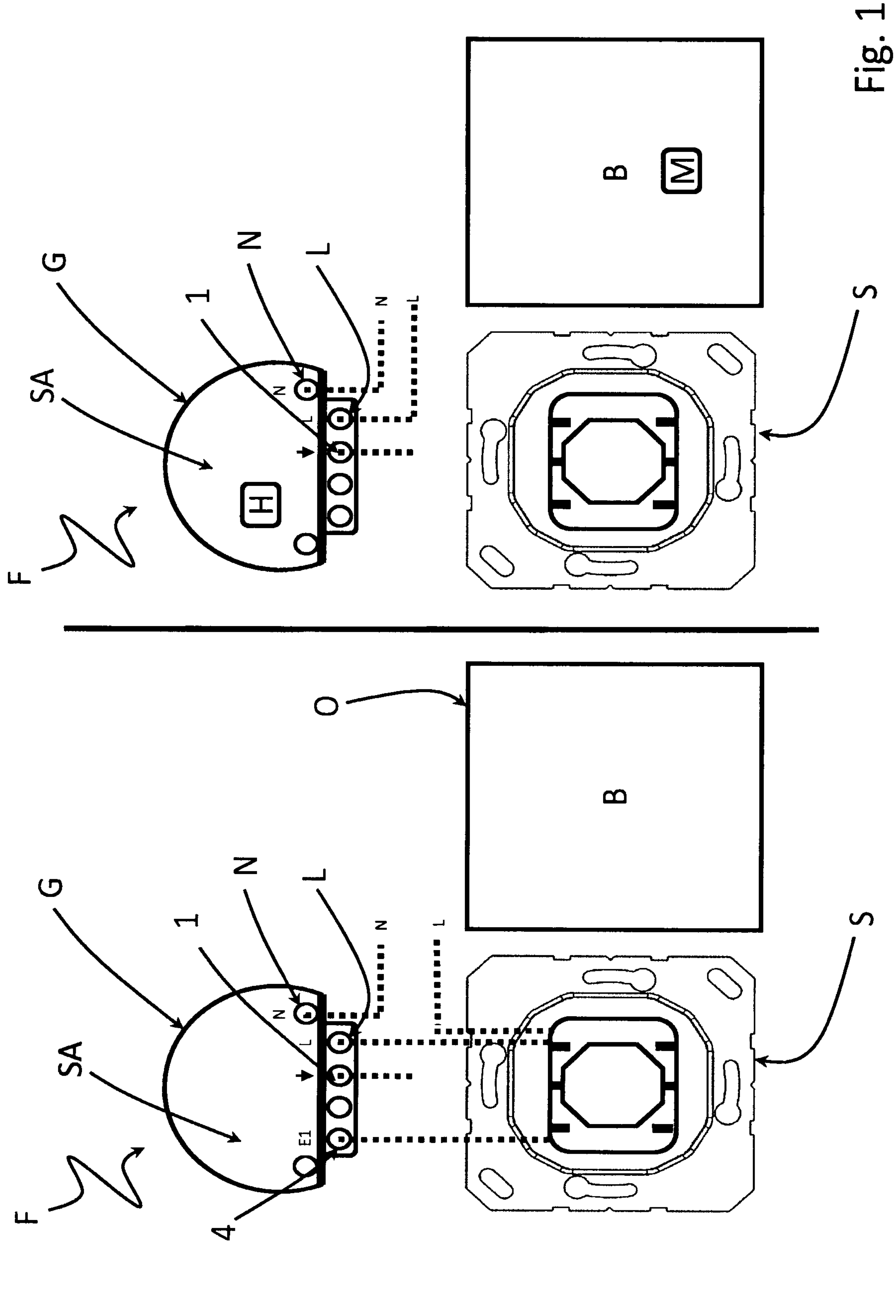
FIG. 1 shows a schematic representation of a functional module according to the disclosure (right), which has a switching actuator, in comparison to a previously known functional module (left), in each case including indicated wiring with respect to the switching device.

FIG. 1 shows on the left a conventional functional module F for installation in an installation box for an electrical/electronic switching device S used in building installation technology, wherein the functional module F can be influenced by means of an actuating element B of an upper part O of the electrical/electronic switching device S by mechanical actuation, in particular by actuation of a rocker switch. This functional module F comprises a housing G, in the interior of which electrical/electronic components necessary for its function are accommodated on at least one electrical circuit board. The at least one electrical circuit board has at least one interface for connecting multiple electrical lines. In this embodiment, the functional module F, presently comprising a switching actuator SA, can switch a socket via this interface. For this purpose, in the arrangement according to the disclosure comprising the functional module F (shown on the right), at least one magnet M is arranged on the upper part O of the electrical/electronic switching device S, which magnet changes its position when the actuating element B is actuated. This change in position, in particular by pivoting along the axis of rotation of a rocker switch, is detected in the functional module F via a sensor H for detecting the magnetic field. The sensed change in the magnetic field is then evaluated in an evaluation unit to identify the electrical/electronic switching device S as a switch. A switch can also be a rotary switch. This ensures that an electrical device, for example a socket, is controlled by the functional module F in such a way that the electrical/electronic switching device S is recognized and controlled as a switch. A control in the case of a switch differs fundamentally from that of a button, in particular in that the switch does not spring back to its original position and thus the switch assumes a permanent open or closed position. This allows an evaluation or identification by the evaluation unit as a switch or as a button. Such identification by the evaluation unit can be carried out, for example, by detecting the magnetic field in a time-resolved manner, wherein advantageously use is made of the fact that when a switch is actuated, in order to bring about the same magnetic field change as when a button is actuated, the operator has to change his grip during operation (double actuation), so that the switch actuation regularly takes longer than a button actuation (where single actuation is sufficient). This allows a simple and reliable identification of the electrical/electronic switching device S as a button or switch. Such identification can alternatively be achieved by making a manual on-site setting on the functional module (for example via a setting option on the functional module) or via remote operation (for example via an application on a mobile device or otherwise via radio communication).

The mathematical evaluation of the magnetic field detected by the magnetic field sensor is carried out vectorially, since this allows a particularly simple and reliable unambiguous determination of the position of the upper part O, especially also in the case of multi-channel operation. The functional module F according to the disclosure thus ensures that the electrical/electronic switching device S still serves as a mechanical switch for accommodating a rocker, but this electrical/electronic switching device S no longer has any electronic connection, i.e. wiring, to the functional module F. This significantly reduces the overall wiring effort required. This also prevents any connected cables from becoming loose when the functional module F is inserted into the installation box.

It is particularly advantageous—especially with regard to the installation effort (less wiring effort) and the installation infrastructure requirements (switch instead of button)—if the interface shown in FIG. 1 has a maximum of one connection for the neutral conductor N, one connection for the phase L and one connection for the load to be connected (not shown for the sake of clarity) via a control line 1.

Figure 2:
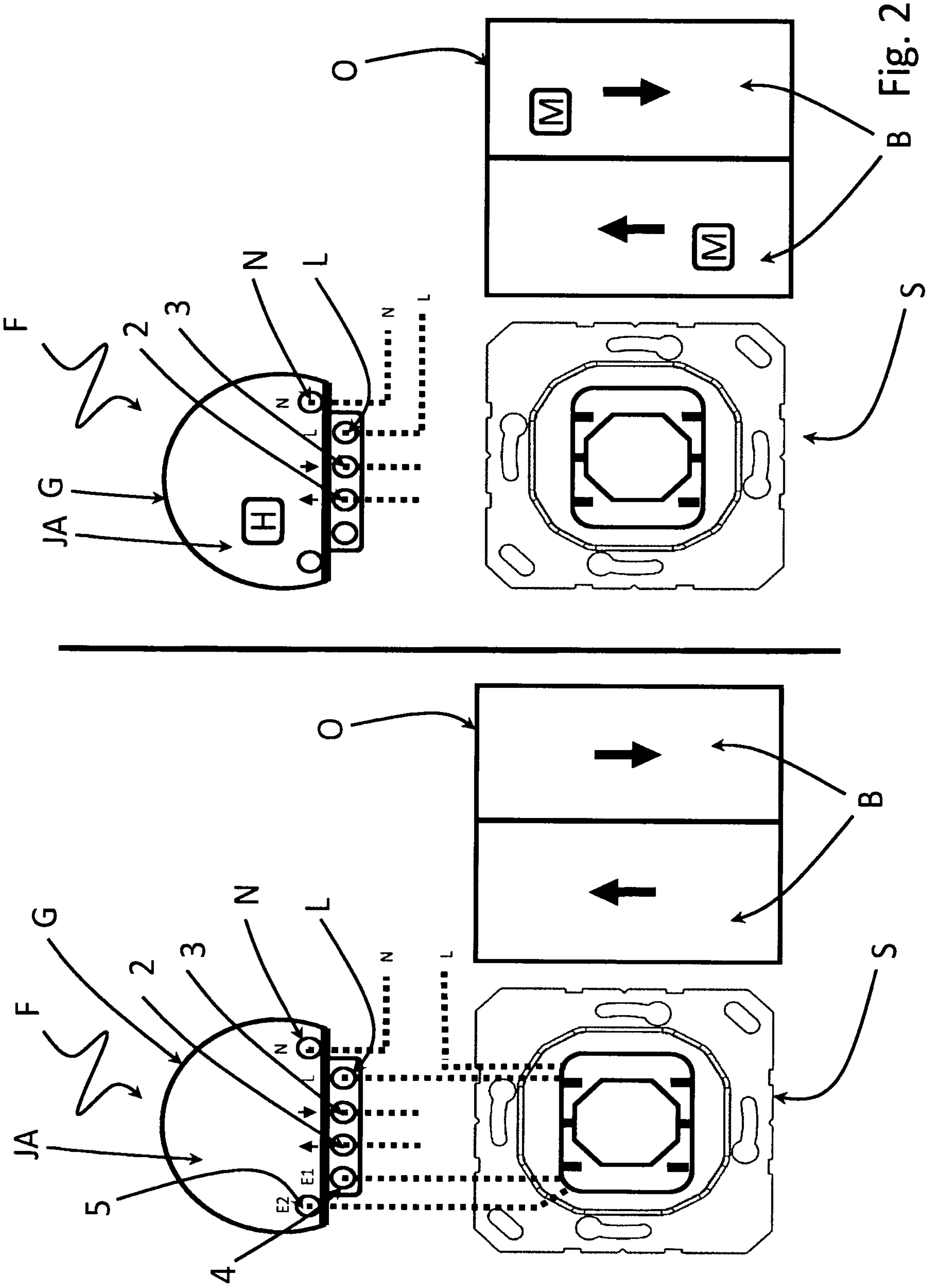
FIG. 2 shows a schematic representation of a functional module according to the disclosure (right), which has a roller blind actuator, in comparison to a previously known functional module (left), in each case including indicated wiring with respect to the switching device.

The savings effect in terms of wiring effort is even more significant when using a functional module F according to the disclosure in FIG. 2 (shown on the right), which has a roller blind actuator JA. In such a roller blind actuator JA, which conventionally has two control lines 2, 3 in addition to the connection to the neutral conductor N and the phase L, as well as two further control lines 4, 5, the number of wires to be used can be reduced from seven to four. Since the installation space in the installation boxes is usually very limited, every single wire that does not have to be connected to the functional module F or the switching device represents an advantage that should not be underestimated.

Figure 3:
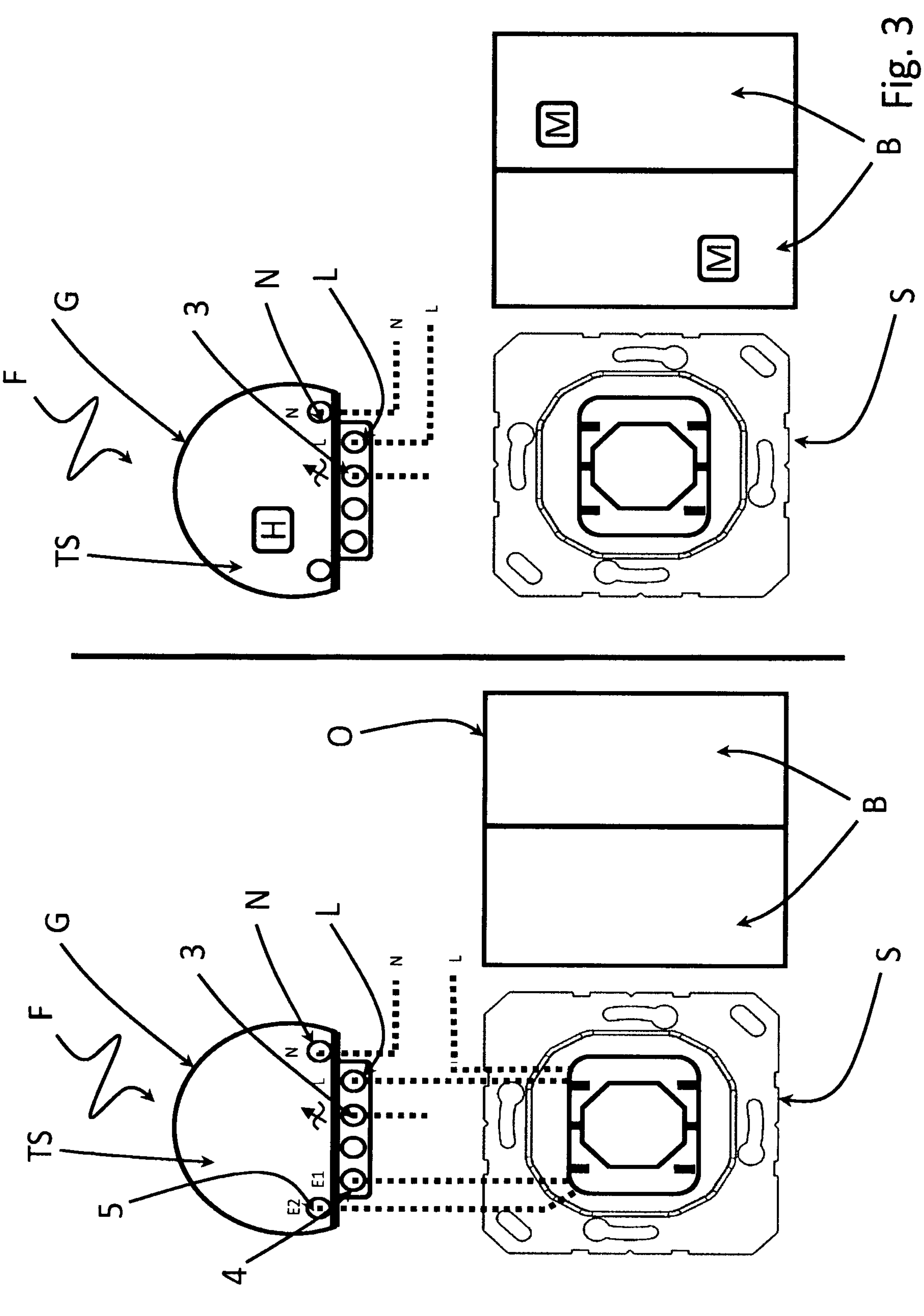
FIG. 3 shows a schematic representation of a functional module according to the disclosure (right), which has a button interface, in comparison to a previously known functional module (left), in each case including indicated wiring with respect to the switching device.
Figure 4:
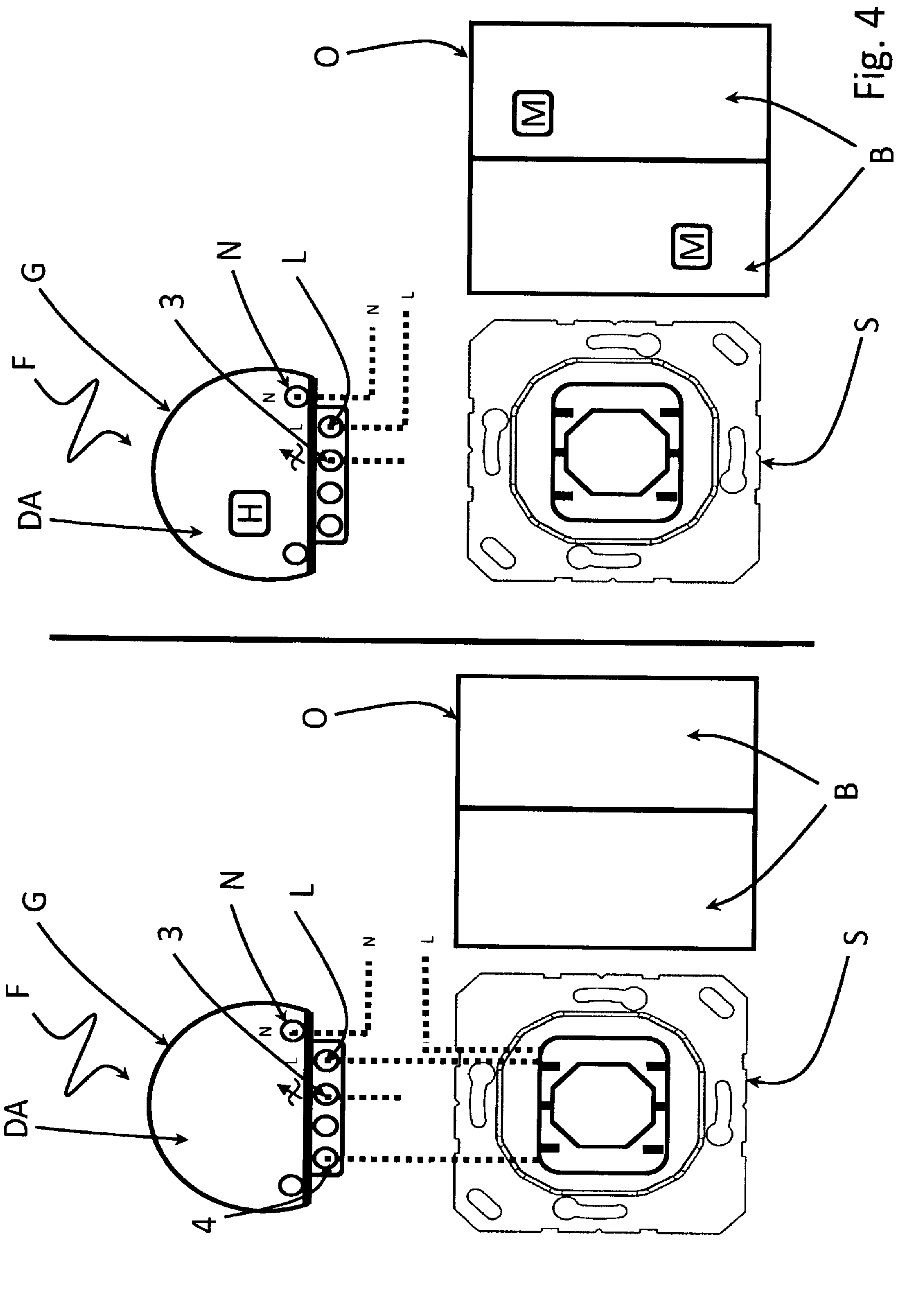
FIG. 4 shows a schematic representation of a functional module according to the disclosure (right), which has a dimming actuator, in comparison to a previously known functional module (left), in each case including indicated wiring with respect to the switching device.

Analogously, FIGS. 3 and 4 show functional modules F according to the disclosure having a button interface TS and a dimming actuator DA, respectively, particularly with regard to their wiring. In FIG. 3, either the neutral conductor N or the control line 3 is connected to the functional module F (in addition to the obvious connection of phase L). The same is the case with FIG. 4 (two-wire operation) or the neutral conductor N and the control line 3 are connected (three-wire operation). Here, too, it can be seen that the wiring effort is considerably reduced. In addition, analogous to the previously described embodiments, the use of a button instead of a switch is effectively avoided, since the described magnetic detection and evaluation of the switching actuation is used instead of an electromechanical switch actuation.

In all embodiments, the wiring effort with regard to the connection of the functional module F according to the disclosure to the phase L and the neutral conductor N can be reduced even further if the functional module F is supplied with energy via an energy storage device, in particular a battery.

The invention has been described on the basis of example embodiments. Without departing the scope of the claims, numerous further embodiments and options for implementing for the invention are apparent to a person skilled in the art, without these having to be shown or explained in greater detail within the context of this disclosure.

LIST OF REFERENCE NUMERALS

B actuating element
DA dimming actuator
F functional module
G housing
JA roller blind actuator
L phase
H sensor
M magnet
N neutral conductor
O upper part
SA switching actuator
S electrical/electronic switching device
TA button interface
1-5 control lines

The invention claimed is:

1. An arrangement of a functional module for installing in an installation box with a manually operable switching device used in building installation technology, wherein an actuating element is connected to the switching device and associated with an upper part of the switching device, and wherein at least one magnet, which changes position when the actuating element is actuated, is arranged on the switching device, comprising:

the functional module having at least one interface, via which at least one actuator is operable in accordance with an actuation of the actuation element, wherein the functional module has a magnetic field sensor for sensing a magnetic field such that a change in the magnetic field is detected when the actuating element is actuated, wherein the functional module has an evaluation unit for evaluating the magnetic field, the evaluation unit configured to identify, based on the change in the magnetic field detected by the magnetic field sensor, what type of switching device is being used, and such identification is used in controlling the at least one actuator by the functional module.

2. The arrangement of claim 1, wherein the at least one magnet is arranged on the actuating element.

3. The arrangement of claim 2, wherein the at least one magnet is arranged on a side of the actuating element facing away from a user during operation.

4. The arrangement of claim 1, wherein the switching device is configured as a button or switch.

5. The arrangement of claim 1, wherein the functional module contains all components necessary for its function in a closed housing, and the interface of the functional module comprises only connections necessary for power supply and/or controlling the at least one actuator.

6. The arrangement of claim 1, wherein the functional module comprises a dimming actuator for dimming a dimmable load.

7. The arrangement of claim 1, wherein the functional module comprises a switching actuator for switching plug sockets.

8. The arrangement of claim 1, wherein the functional module comprises a blind actuator for controlling blinds.

9. The arrangement of claim 1, wherein the functional module comprises a tactile sensor for actuating an electrical device.

10. The arrangement of claim 1, wherein the magnetic field sensor is a MEMS magnetic sensor.

11. The arrangement of claim 1, wherein the at least one magnet is adhesively bonded or mechanically fixed to the actuating element.

12. The arrangement of claim 1, wherein the functional module is supplied with energy by an energy storage device.

13. The arrangement of claim 12, wherein the energy storage device is a battery.

14. A method for operating a functional module of an arrangement according to claim 1, comprising the steps:

sensing, by a magnetic field sensor of the functional module, the magnetic field produced by the at least one magnet arranged on the switching device, detecting the change in the magnetic field as a result of a predetermined actuation of the actuating element, evaluating the detected change in the magnetic field by an evaluation unit of the functional module to determine what type of switching device is being used, and controlling an actuator by the functional module in accordance with a predetermined function mode, depending on the type of switching device identified.

15. The method of claim 14, wherein the evaluation unit determines whether the switching device is a button or switch.

* * * * *